United States Patent
Pace

(10) Patent No.: US 6,764,593 B1
(45) Date of Patent: Jul. 20, 2004

(54) AUTOMOBILE AIR CONDITIONING REFRIGERANT FILTER

(76) Inventor: Scot M. Pace, 3816 W. Sligh Ave., Tampa, FL (US) 33614

(*) Notice: Subject to any disclaimer, the term of this patent is extended or adjusted under 35 U.S.C. 154(b) by 0 days.

(21) Appl. No.: 10/289,034

(22) Filed: Nov. 6, 2002

(51) Int. Cl.⁷ .......................... B01D 29/00; F25B 43/00
(52) U.S. Cl. .......................... 210/92; 210/435; 210/450; 210/451; 55/487; 55/525
(58) Field of Search .......................... 210/92, 232, 435, 210/450, 451, 455, 266, 282; 62/474; 55/318, 385.3, 418, 487, 495, 502, 525

(56) References Cited

U.S. PATENT DOCUMENTS

| | | | |
|---|---|---|---|
| 2,225,990 A | * 12/1940 | Henry | 96/118 |
| 2,525,287 A | * 10/1950 | Cuno | 210/443 |
| 2,862,623 A | * 12/1958 | Werner | 210/445 |
| 3,680,707 A | * 8/1972 | Zeek | 210/266 |
| 3,909,221 A | * 9/1975 | Bengtsson | 55/314 |
| 4,209,401 A | * 6/1980 | Henton | 210/136 |
| 4,364,756 A | * 12/1982 | Clarke et al. | 96/137 |
| 4,637,881 A | * 1/1987 | Sciuto | 210/689 |
| 4,811,571 A | * 3/1989 | Mayer | 62/474 |
| 4,908,132 A | * 3/1990 | Koval et al. | 210/446 |

* cited by examiner

*Primary Examiner*—Frank M. Lawrence
(74) *Attorney, Agent, or Firm*—Pettis & Van Royen, P.A.

(57) ABSTRACT

A refrigerant filter, attachable to automotive air-conditioning systems, for removal of debris from air-conditioning refrigerants. The filter media is contained within a two-part hollow body for flow-through filtration of the refrigerants. The first and second parts of the hollow body are sealingly and removably attachable to one another to easily gain access to the filter media, which permits replacement of the filter media without removal of the filter body from the refrigerant line. The apparatus includes a first and second filter media, in which the second filter media prevent transfer of portions of the first filter media into the air-conditioning system.

6 Claims, 4 Drawing Sheets

AUTOMOBILE AIR CONDITIONING REFRIGERANT FILTER

BACKGROUND OF THE INVENTION

1. Field of the Invention

The present intention relates to an accessible filter for removal of debris from auto air conditioning refrigerants. The filter media is contained within a two-part body for flow-through filtration of the contaminated air conditioning refrigerants.

2. Description of the Prior Art

Auto air conditioning systems are typically manufactured without a filter for the refrigerant. When a compressor fails, debris is passed throughout the air conditioning system from the time that the compressor commences breaking down until it seizes or stops functioning. During the replacement of the compressor, a permanent suction filter is inserted in the refrigerant line hose to the compressor to collect debris and prevent it from entering the compressor. A permanent suction filter is defined as a filter unit that must be replaced in its entirety, including the housing, the filter components, connectors and the filter media. The permanent suction filters are attached by crimped barbed connectors to the refrigerant line which is rubber hose with a liner. Usually there is a large amount of debris that has collected within the air conditioning system, so that the suction filter is quickly overloaded impeding the flow of refrigerant. The filters must then be replaced by cutting out the whole filter unit and replacing it with another permanent filter unit. The refrigerant hose is now too short and must be totally replaced.

Often filter media breaks loose and passes through the refrigerant line to the compressor damaging the compressor.

Not withstanding the existence of these permanent suction filter units, there is a need for a means to replace filter material without having to remove the entire filter unit from the air conditioning refrigerant line.

SUMMARY OF THE INVENTION

The present invention relates to a filter for removing debris from auto air conditioning refrigerant, particularly after failure of a compressor which injects debris into the auto air conditioning system. The invention comprises a flow-through filter that has a two-part hollow body. The first and second part of the hollow body are sealingly and removably attachable to one another to easily gain access to the filter media that is housed within the interior space of the hollow. This allows replacement of the filter media without removal of the filter body from the refrigerant line.

The body has an inlet aperture and an outlet aperture. An attaching means is attached to the inlet aperture so that the inlet aperture may be connected in fluid flow relationship with a refrigerant line of the air conditioning system. An attaching means is also attached to the outlet aperture to enable the outlet aperture to be connected in fluid flow relationship with the same refrigerant line.

A first filter media, having a first side and a second side is removably insertable into the interior space of the body so that any refrigerant passing into the body through the inlet aperture and out the outlet aperture passes through the first filter media.

The invention accordingly comprises an article of manufacturer possessing the features, properties, and the relation to elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF A PREFERRED EMBODIMENT

Figure 3:
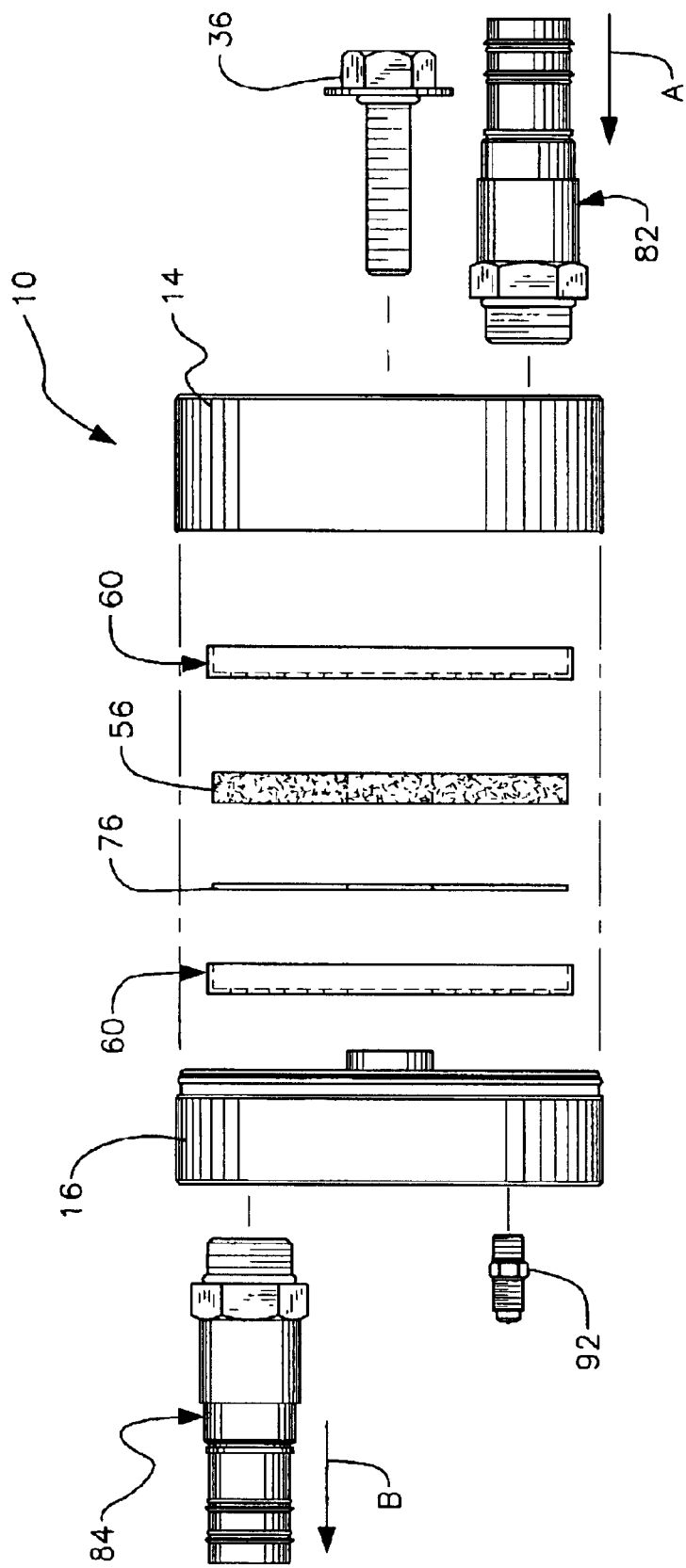
FIG. 3 is an exploded view of the invention of FIG. 1.
Figure 4:
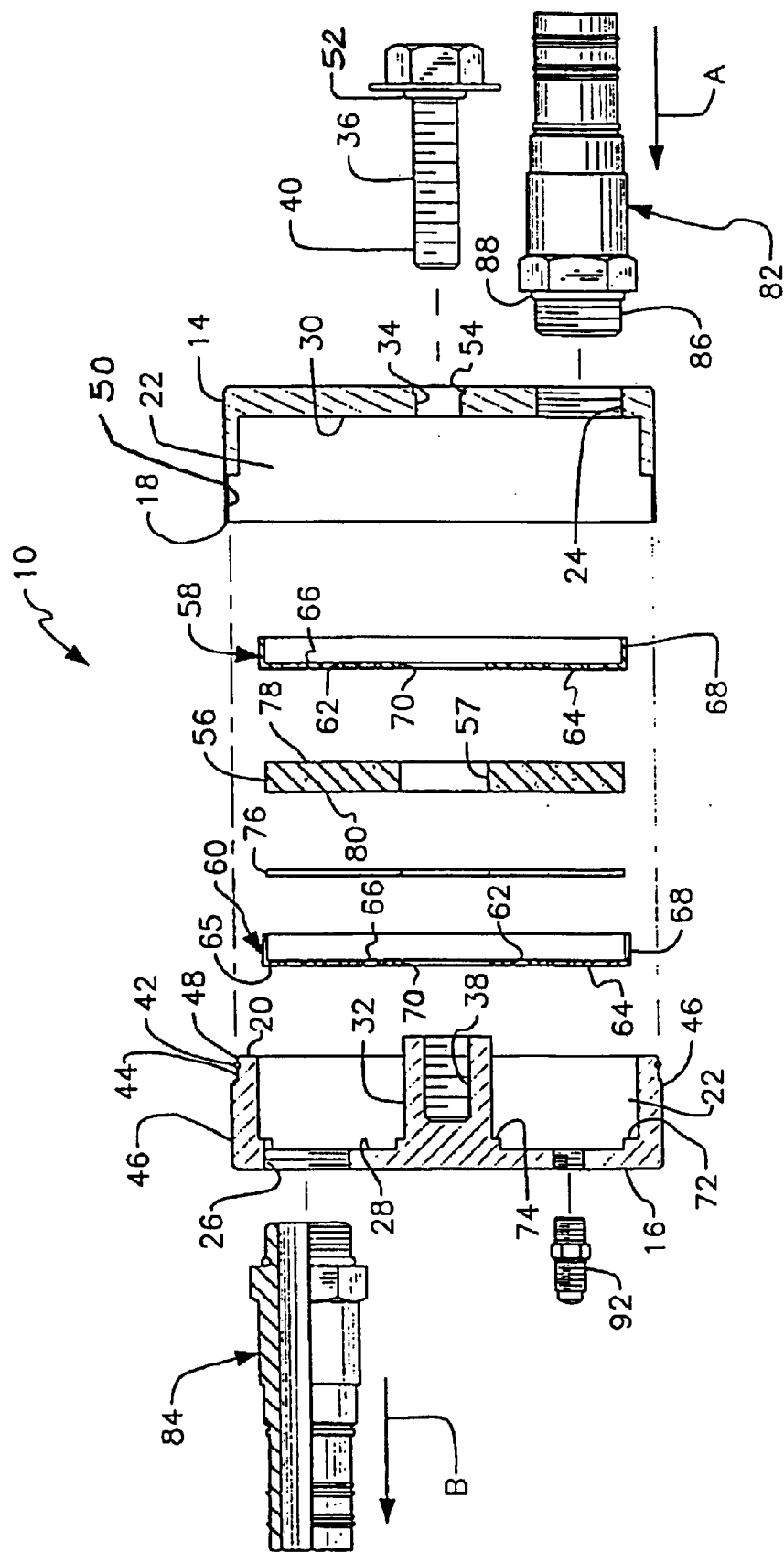
FIG. 4 is a partial cross sectional exploded view of the invention of FIG. 1.

A preferred embodiment for the refrigerant filter of this invention is illustrated in the drawing FIGS. 1–4, in which the apparatus is generally indicated as 10. Referring first to the view of FIG. 1, it can be seen that the refrigerant filter 10 comprises a body 12 that has a first part 14 and a second part 16. As a seen in FIG. 2, in a preferred embodiment, the body 12 is cylindrical; however, the body 12 may be any suitable shape. The first part 12 and second part 16 are sealingly and removably attachable to one another. As seen in FIG. 3 and FIG. 4, the first part 14 is hollow and has an open-end 18 and the second part 16 is also hollow and has an open-end 20. When the two parts are aligned and attached to one another at their open ends 18 and 20 an interior space 22 is defined. The first part 14 has an inlet aperture 24 and the second part 16 has an outlet aperture 26.

In a preferred embodiment, the second part 16 further comprises an interior surface 28, and the first part 14 has an interior surface 30. To the interior surface of one of the parts, conveniently the interior surface 28 of the second part 16 is attached a post 32 that extends inwardly toward the first part 14. The first part 14 has an opening 34 therethrough which is sized to receive a bolt 36 therethrough, The post 32 has a threaded hole 38 which is sized and configured to threadably receive the threads 40 of the bolt 36, so that the first part is removably attachable to the second part. To provide a sealed closure a first O-ring 42 is mounted between the two parts. Conveniently, the second part 16 has a first annular recess 44 formed about the outside surface 46 of the second part 16 proximal to and including the open-end 20. A groove 48 is formed in the first recess 44 to receive the first O-ring 42 therein. A second recess 50 is formed circumferentially in the interior surface 30 of the first part 14 proximal to and including the open-end 18. The second recess 50 is sized and configured to receive the first recess 44 therein compressing the O-ring therebetween and providing a sealed closure as the bolt 36 is tightened. A second O-ring 52 is sized and configured to be received by the threaded portion of the bolt 36 and received by the third annular recess 54 formed about the opening 34 to receive the O-ring 52 therein sealing the opening 34 as the bolt 36 is tightened.

A first filter media 56 is removably insertable into the interior 22 of the body 12 so that any refrigerant passing into the body through the inlet aperture 24 and out the outlet aperture 26 must pass through the first filter media 56. In a preferred embodiment the first media 56 has a hole 57 therethrough so that the first filter media 56 may be mounted on the post 32 and the bolt 36 may pass therethrough. In a preferred embodiment the first filter media 56 is sized to remove all debris particles that are 10 microns or larger in size. In a preferred embodiment, a pad of refined needlepoint fiberglass is used to make the first filter media 56. This pad of material is compacted until the permeability is sufficiently small that the first filter media 56 captures particles of debris of 10 microns or larger. This pad of filter media is approximately one-half of an inch thick. Those skilled in the art will be able to select other filter media that is suitable for the purpose. Using filter material that filters out all debris particles equal to or larger than 10 microns is a preferred embodiment, as particles larger than 10 microns are likely to cause damage to the new compressor.

Figure 5:
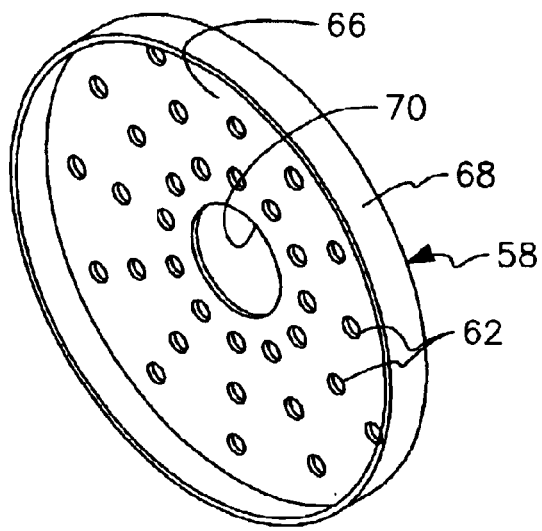
FIG. 5 is a detailed isometric view of a diffuser plate of the invention of FIG. 3.
Figure 6:
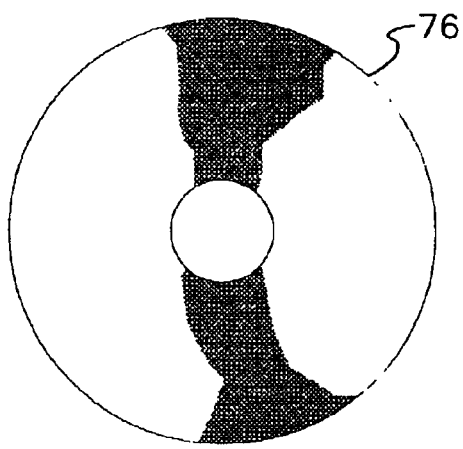
FIG. 6 is a detailed front elevational view of the second filter media of the invention of FIG. 1.
Figure 7:
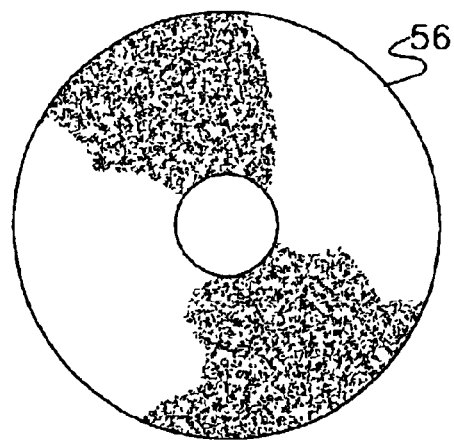
FIG. 7 is a detailed front elevational view of the first filter media of the invention of FIG. 1.

A first diffuser plate 58 and a second diffuser plate 60, as seen in FIGS. 4 & 5, have a plurality of holes 62 therethrough for flow of the refrigerant therethrough. In a preferred embodiment, the diffuser plates are generally identically constructed. Each diffuser plate has a front face 64, that has a peripheral edge 65, a rear face 66, and an annular flange 68 extending outwardly from the rear face so that it is generally perpendicular thereto. Each diffuser plate 58 and 60 also has a central hole 70 for mounting the diffuser plates 58 and 60 on the post 32. The second part 16 has a first annular ledge 72 and a second annular ledge 74 extending from the interior surface 16 to support the peripheral edge 65 of the front face 64 of the second diffuser plate 60, when it is inserted within the hollow second part 16. The annular ledges is 72 and 74 space the second diffuser plate 60 from the outlet aperture 26. The first diffuser plate 58 is inserted within the hollow first part 14 so that the annular flange faces toward the inlet aperture and engages the interior surface 30, thereby spacing the rear face 66 of the first diffuser plate 58 from the inlet aperture 24. Thus the first side 78 of the first filter media 56 lies adjacent to the first diffuser plate.

A second filter media 76 is sized and configured to be received within the annular flange 68 of the second diffuser plate 60. The first filter media 56 is also sized and configured to be received within the annular flange 68 of the second diffuser plate 60. This arrangement holds the filter media 56 and 76 in place for easy insertion within the body 12. Thus the second filter media 76 lies adjacent the second side 80 of the filter media 56. The second filter media 76 has a permeability that is greater than the permeability of the first filter media 56. In a preferred embodiment, the second filter media 76 is constructed from wire cloth having 100 openings per square inch, which is clearly a greater permeability than that of the first filter media 56. A wire cloth, or other cloth made from well-known materials suitable for this purpose, is preferred as the primary purpose of the second filter media 76 is to prevent portions of the first filter media 56 from passing into the refrigerant line and thus into the compressor causing damage thereto.

Figure 8:
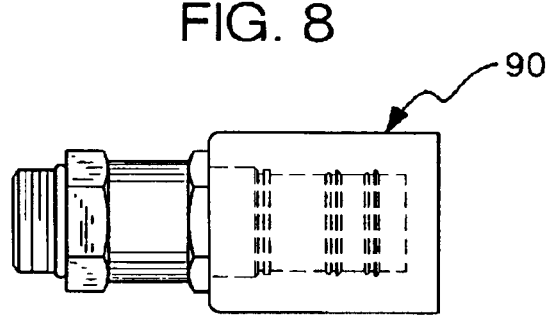
FIG. 8 is side elevational view of a second embodiment of an attaching means.

A first attaching means 82 is attached in fluid flow communication to the first inlet aperture 24 and a second attaching means 84 is attached in fluid flow communication to the outlet aperture 26. The attaching means 82 and 84 are designed and configured to be attachable to and in fluid flow relationship with a refrigerant line of an auto air-conditioning system. In a preferred embodiment, the attaching means 82 and 84 are conveniently hose barbs that are sized and configured to be received within the refrigerant line. For example, the first end 86 of the hose barb 82 is threaded to be threadably received within the threaded inlet aperture 24. An O-ring 88 is mounted on the first end 86 of the hose barb 82 and is compressed between the hose barb 82 and the first part 14 of the body 12 to make the connection fluid tight. The second hose barb 84 is attached in the same manner to the outlet aperture in the second part 16 of the body 12. The hose barbs 82 and 84 are sized and configured to receive a refrigerant hose (not shown) thereon in the well-known manner. The refrigerant hose is then clamped or crimped, when using a crimp shell casing 90 as shown in FIG. 8, to the hose barbs 82 and 84. The method of attaching a crimp shell casing is well-known and will not be further discussed.

A test valve 92 is inserted through the second part 16 of the body 12 so that samples may be taken of the refrigerant after the refrigerant has passed through the filter, and airflow and pressures may be examined. In a preferred embodiment, the test valve 92 is a type of valve fitting that opens when depressed, for example valves manufactured by A. Schrader's Son, Inc. of New York, N.Y., that are used in tire valve stems and on air-conditioning hoses.

In a preferred embodiment, the filter apparatus is constructed primarily from aluminum, with the exception being the filter media and the O-rings which are constructed from rubber or other suitable materials. In other embodiments, the body of the filter may be constructed from steel, plastics or other materials that are suitable for the purpose.

Having thus set forth a preferred construction for the current invention, attention is now invited to a description of the use of the refrigerant filter.

When a compressor begins failing, debris is distributed and collects throughout the various parts of the auto air-conditioning system, and much of it will not be removed by flushing. Therefore, when a new compressor is installed and the system is reactivated, the debris is carried by the refrigerant throughout the air-conditioning system including the compressor, which often causes the compressor to fail again.

Therefore, the portion of the refrigerant suction line (not shown), usually a rubber hose with a liner, that extends between the evaporator and the compressor of the air-conditioning system is cut for attachment of the filter 10. In a preferred embodiment, the attaching means, that comprises the hose barbs with a crimp shell casing 90, is used to attach the filter to the two parts of the cut refrigerant suction line, which makes a generally permanent connection.

Figure 1:
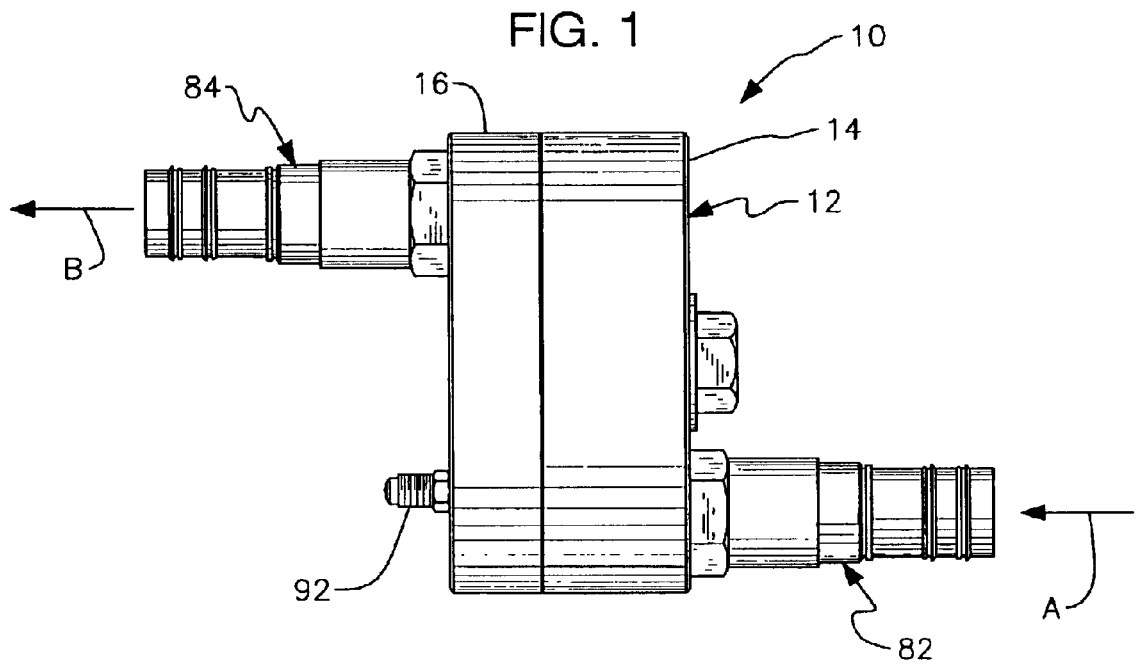
FIG. 1 is a side elevational view of this invention.
Figure 2:
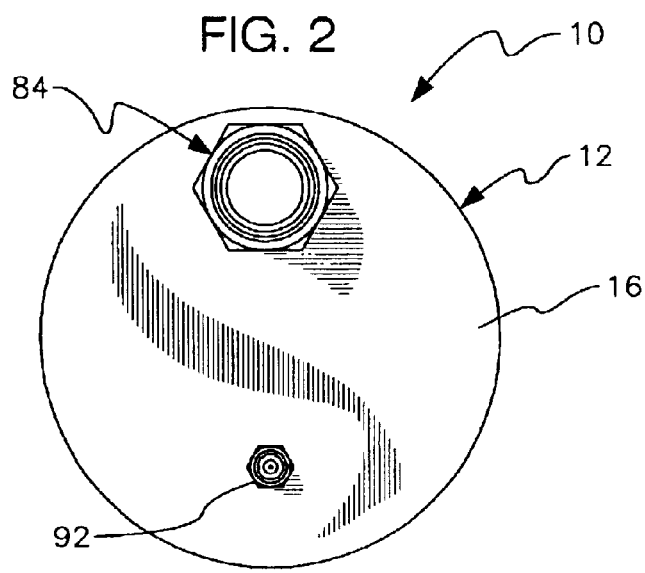
FIG. 2 is a front elevational view of the invention of FIG. 1.

As seen in FIGS. 1,3 and 4, arrows A indicate the input side of the apparatus 10 and arrows B indicate the output side of the apparatus 10. The refrigerant flows from the evaporator into the inlet hose barb 82 through the first diffuser plate 58, which permits distribution of the refrigerant over the whole first filter media 56. The refrigerant then flows through and is filtered by first filter media, which removing contaminants sized 10 microns and larger. The refrigerant then passes through the second filter media 76, which is a cloth or wire mesh. The cloth or wire mesh prevents transfer of any of the first filter media into the air-conditioning system. The refrigerant then flows through the second diffuser plate 60, which again prevents channeling all of the refrigerant through a small portion of the first filter media 56. The refrigerant then continues on to the compressor to complete the air-conditioning process.

Often the filter media 56 quickly becomes clogged by contaminants destroying the effectiveness of the air-conditioning system. This can be determined by taking samples of the airflow and pressure through the test valve 92. Once the flow of refrigerant becomes restricted the mechanic collects and removes the refrigerant from the air conditioning system. The mechanic can then remove the bolt 36, separate the first part 14 and the second part 16, remove the filter media 56 and flush the interior of the apparatus 10. The mechanic then replaces the first filter media 56 with a new first filter media and then closes the two parts of the body with the bolt 36. The apparatus 10 is now ready for the continued operation of the air-conditioning system.

This apparatus has been defined as an automobile air conditioning refrigerant filter. However, automotive air conditioning systems are frequently used in small planes, and this apparatus for removal of debris from air conditioning refrigerant is particularly applicable to small air craft air conditioning systems.

While the foregoing describes a particularly preferred embodiment of the present invention, it is to be understood that numerous variations and modifications of the structure will occur to those skilled in the art. Accordingly, the foregoing description is to be considered illustrative only of the principles of this invention and is not to be considered limitative thereof, the scope of the invention being determined solely by the claims appended hereto.

What is claimed is:

1. Apparatus for removal of debris from auto air conditioning refrigerant comprising:

a hollow body defining an interior space, said body having a first part and a second part, said first part of said body and said second part of said body being sealingly and removably attachable to one another, said body having an inlet aperture and an outlet aperture;

a first filter media, having a first side and a second side, being removably insertable in said interior space of said body such that any refrigerant passing into said body through said inlet aperture and out said outlet aperture passes through said first filter media;

a first and a second diffuser plate inserted within said interior space of said body of said apparatus, said first diffuser plate being proximal to and spaced apart from said inlet aperture, said first side of said first filter media lying adjacent said first diffuser plate, said second diffuser plate being proximal to and spaced apart from said outlet aperture, a second filter media having a permeability greater than that of said first filter media, being inserted in said body intermediate said second side of said first filter media and said second diffuser plate; and a first attaching means attached in fluid flow communication to said inlet aperture and a second attaching means attached in fluid flow communication to said outlet aperture, said first and second attaching means being designed and configured to be attachable to and in fluid flow relationship with a refrigerant line of an auto and small air craft air conditioning system.

2. An apparatus as in claim 1 wherein said second filter media is comprised of wire cloth.

3. An apparatus as in claim 1 wherein said second diffuser plate has a front face having a peripheral edge, a rear face having a flange extending outwardly therefrom at generally a right angle thereto, and said body having a shoulder formed in said body that is sized and configured to engage said peripheral edge of said front face of said second diffuser plate, spacing said second diffuser plate from said outlet aperture.

4. An apparatus as in claim 1 further comprising a test valve, said test valve being attached to and passing through said body proximal said outlet aperture, so that said test valve is in fluid flow communication with said body.

5. An apparatus as in claim 1 wherein one of said first and second parts of said body further comprises a post extending inwardly therefrom into said interior space of said body, said post having a threaded hole therein, the other one of said first and second parts of said body having an opening therethrough such that a bolt inserted into said body through said opening is threadably attachable to said hole in said post, whereby said first and second parts of said body are attachable to one another.

6. An apparatus as in claim 5 wherein said first part of said body comprises an open end and said second part of said body comprises an open end, said open end of one of said first and second parts being received in said open end of the other one of said first and second parts of said body and said first and second parts being sealed to one another by a first O-ring compressed between said first and second parts of said body and a second O-ring compressed between said bolt and said body.

* * * * *